United States Patent
Oudin et al.

(10) Patent No.: US 9,120,556 B2
(45) Date of Patent: Sep. 1, 2015

(54) METHOD AND DEVICE FOR ESTIMATING AN UNWANTED PITCH MOMENT OF AN AIRCRAFT, AND APPLICATIONS TO THE PITCH CONTROL OF THE AIRCRAFT

(71) Applicant: Airbus Operations (SAS), Toulouse (FR)

(72) Inventors: Simon Oudin, Toulouse (FR); Guilhem Puyou, Toulouse (FR); Stephane Delannoy, Sainte Marie (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/182,743

(22) Filed: Feb. 18, 2014

(65) Prior Publication Data

US 2014/0236399 A1 Aug. 21, 2014

(30) Foreign Application Priority Data

Feb. 19, 2013 (FR) ...................................... 13 51382

(51) Int. Cl.
*B64C 19/00* (2006.01)
*B64D 45/00* (2006.01)
*G05D 1/08* (2006.01)

(52) U.S. Cl.
CPC ................ *B64C 19/00* (2013.01); *B64D 45/00* (2013.01); *G05D 1/0825* (2013.01)

(58) Field of Classification Search
None
See application file for complete search history.

(56) References Cited

U.S. PATENT DOCUMENTS

| 3,963,197 | A  | * | 6/1976  | Oberlerchner ................ | 244/181   |
|-----------|----|---|---------|-------------------------------|-----------|
| 4,003,533 | A  | * | 1/1977  | Carter et al. .................. | 244/217   |
| 4,569,494 | A  | * | 2/1986  | Sakata ........................ | 244/199.1 |
| 5,112,009 | A  | * | 5/1992  | Farineau ...................... | 244/181   |
| 6,325,333 | B1 | * | 12/2001 | Najmabadi et al. ........... | 244/181   |
| 7,284,984 | B1 | * | 10/2007 | Zyskowski ..................... | 434/30    |
| 7,720,578 | B2 |   | 5/2010  | Delannoy                      |           |
| 8,014,906 | B2 | * | 9/2011  | Luo .................................. | 701/3     |
| 8,489,257 | B2 | * | 7/2013  | Holzhausen ..................... | 701/4     |
| 8,718,839 | B2 | * | 5/2014  | Everett et al. ..................... | 701/3     |
| 2003/0106958 | A1 | * | 6/2003  | Gold et al. .................. | 244/17.13 |
| 2003/0127569 | A1 | * | 7/2003  | Bacon et al. .................. | 244/195   |
| 2004/0093130 | A1 | * | 5/2004  | Osder et al. ...................... | 701/3     |
| 2005/0173595 | A1 | * | 8/2005  | Hoh .................................. | 244/223   |
| 2005/0242234 | A1 | * | 11/2005 | Mahmulyin ................. | 244/75.1  |
| 2007/0084962 | A1 | * | 4/2007  | Zientek ....................... | 244/17.11 |
| 2008/0043234 | A1 | * | 2/2008  | Mirand et al. ................ | 356/342   |
| 2008/0237402 | A1 | * | 10/2008 | Ausman et al. ............... | 244/229   |
| 2008/0251648 | A1 | * | 10/2008 | Colomer et al. ............ | 244/76 C  |
| 2008/0265104 | A1 | * | 10/2008 | Fabre-Raimbault et al. ........ | 244/76 C  |
| 2009/0043432 | A1 | * | 2/2009  | Bazile ............................. | 701/14    |
| 2009/0125165 | A1 | * | 5/2009  | Delannoy ......................... | 701/3     |
| 2009/0138147 | A1 | * | 5/2009  | Grinits et al. .................... | 701/14    |
| 2009/0314900 | A1 | * | 12/2009 | Puig et al. .................... | 244/76 C  |
| 2010/0042271 | A1 | * | 2/2010  | Holzhausen ........................ | 701/4     |
| 2011/0095136 | A1 | * | 4/2011  | Schwarze et al. ............. | 244/215   |
| 2011/0168851 | A1 | * | 7/2011  | Cherepinsky ................. | 244/223   |
| 2012/0145834 | A1 | * | 6/2012  | Morgan et al. ............... | 244/90 R  |

OTHER PUBLICATIONS

French Search Report, Dec. 5, 2013.

* cited by examiner

*Primary Examiner* — Jonathan M Dager
(74) *Attorney, Agent, or Firm* — Greer, Burns & Crain, Ltd.

(57) ABSTRACT

A method and device for estimating an unwanted pitch moment of an aircraft, and applications to the pitch control of the aircraft. The device estimates an unwanted pitch moment, which can be used to form a compensation command which is added to a standard deflection command with the aim of producing an automatic, active compensation, in real time, for the unwanted pitch moment of the aircraft.

9 Claims, 1 Drawing Sheet

METHOD AND DEVICE FOR ESTIMATING AN UNWANTED PITCH MOMENT OF AN AIRCRAFT, AND APPLICATIONS TO THE PITCH CONTROL OF THE AIRCRAFT

CROSS-REFERENCES TO RELATED APPLICATIONS

This application claims the benefit of the French patent application No. 1351382 filed on Feb. 19, 2013, the entire disclosures of which are incorporated herein by way of reference.

BACKGROUND OF THE INVENTION

The present invention relates to a method and a device for automatic estimation of an unwanted pitch moment of an aircraft, in particular a transport aircraft, and also a method and a system for controlling the pitch of an aircraft performing automatic compensation for such an unwanted pitch moment.

It is known that on an aircraft with electrical flight controls, the aircraft is controlled in flight by a pilot, in a manual flight mode, using control members, namely the control stick (in particular a mini-stick), the rudder bar and the thrust control lever. The flight computer(s) interpret(s) the actions of the pilot on these control members and produce corresponding commands which are then sent to control surface actuators (ailerons, spoilers, elevators, etc.) of the aircraft to control the deflection of these control surfaces and thus the aircraft's flight.

With regard to the pitch axis of the aircraft, particularly for a short-term command (of the order of a few seconds, and generally less than ten seconds) made by the pilot of the aircraft, the flight control computers calculate elevator deflection commands, using for that purpose, in general, a standard mathematical law known as C*, detailed below.

However, the pitching movement of the aircraft in flight can be disrupted by (short term) moments that are unwanted, such as:
- a pitch moment produced by the extension and retraction of movable surfaces on the main wing of the aircraft;
- a pitch moment produced by the extension and retraction of the aircraft's flaps;
- pitch moments resulting from transient aerodynamic effects: effects related to the Mach below and above given angles of attack and effects related to the presence of ice on the wing; and
- a pitch moment produced by a variation in thrust.

Within the scope of the present invention, the term "unwanted pitch moments" is used to describe pitch moments of the aircraft as described above, which are produced in the short term (of the order of a few seconds), which have disruptive effects as detailed below, which are not produced by an action by the pilot on the control stick (mini-stick) and which are not wanted.

These unwanted moments can impair the performance of the aircraft, when it is controlled by the C* law alone. They can also have an adverse effect on the comfort of the pilot and the passengers.

SUMMARY OF THE INVENTION

The present invention relates to a method for estimating an unwanted pitch moment of an aircraft, which can be used to remedy the disadvantages mentioned above.

To this end, according to the invention, said method for estimating an unwanted pitch moment of an aircraft is distinctive in that it comprises steps to:
- determine the current values of the angle of attack and of the pitch rate of the aircraft, and also the angle of deflection of at least one elevator of the aircraft;
- determine the current values of coefficients forming part of a desired reference model of the longitudinal movement of the aircraft;
- calculate a pitch moment $\Delta \hat{m}$ using the current values thus determined, preferably using the following expression:

$$\Delta \hat{m} = \dot{q} - m\alpha*(\alpha - \alpha eq) - mq*q - m\delta q*\delta q$$

where:
- q is the current value of the pitch rate of the aircraft (in deg/sec);
- $\dot{q}$ is the pitch rate derivative (in deg/$s^2$);
- $\alpha$ is the current value of the aircraft's angle of attack (in degrees);
- $\alpha$eq is an equilibrium value of the aircraft's angle of attack (in degrees);
- $\delta q$ is the current value of the elevator's angle of deflection (in degrees); and
- $m\alpha$, $mq$, $m\delta q$ are said current coefficient values; and
- send to user means the pitch moment thus calculated, which represents an estimated unwanted pitch moment.

Thus, by virtue of the invention, any unwanted pitch moment that may be produced on the aircraft is estimated automatically, accurately and in real time. This estimated unwanted pitch moment is a total moment that illustrates the difference between the actual pitch behavior, observed on the aircraft, and the behavior that ought to occur according to the current situation, taking into account a reference model, as detailed below.

This total pitch moment can correspond to one or more of the following moments, which are produced at the current time on the aircraft:
- a pitch moment produced by the extension and retraction of the aircraft's spoilers;
- a pitch moment produced by the extension and retraction of the aircraft's flaps;
- pitch moments resulting from transient aerodynamic effects below and above given angles of attack; and
- a pitch moment produced by a variation in thrust.

The determination, in accordance with the present invention, of this total unwanted pitch moment does not require any knowledge of the change, over time, in the different individual unwanted moments that can act on the aircraft, such changes over time being difficult to estimate.

Advantageously, said current values of the angle of attack, pitch rate and angle of deflection of the elevator are measured on the aircraft.

Furthermore, advantageously, said step of determining the current coefficient values comprises:
- a sub-step of determining current values of parameters related to the current flight point of the aircraft; and
- a sub-step of determining said coefficients, using said current parameter values and predetermined tables.

The unwanted pitch moment, determined in accordance with the invention, can be used by different means (or systems) of the aircraft, known as user means. In a preferred application, this pitch moment is used to calculate compensation commands enabling compensation to be effected automatically.

Therefore, the present invention also relates to a method for controlling the pitch of an aircraft, able to implement automatic, active compensation for disruptive (unwanted) pitch moments.

According to the invention, said method for controlling the pitch of an aircraft, of the type comprising a step of producing a command for controlled deflection of at least one elevator, in accordance with a standard control law, said controlled deflection command being representative of a manual actuation by a pilot, and a step of applying to the aircraft an actual deflection command dependent on said controlled deflection command, is distinctive in that it comprises, in addition, steps of:

estimating an unwanted pitch moment, implementing the method described above;

calculating a compensation command, from the unwanted pitch moment thus estimated; and summing said compensation command and said controlled deflection command to form said actual deflection command which is applied to the aircraft.

Thus, by virtue of this method, any unwanted moments that disrupt the pitch of the aircraft are automatically and actively compensated in such a way that said pitch remains unaffected by these moments as far as the pilot is concerned. This compensation, which uses the method according to the invention for estimating an unwanted pitch moment, therefore does not require any knowledge of the different individual unwanted moments that can act on the aircraft.

Advantageously, the compensation command $\delta_{qc}^{ANL}$ is calculated using the following expression:

$$\delta_{qc}^{ANL} = -(\Delta \hat{m}/m\delta q)$$

where:

$\Delta \hat{m}$ is the unwanted pitch moment as estimated; and $m\delta q$ is a coefficient of a reference model, detailed below.

The present invention relates, in addition, to a device for estimating an unwanted pitch moment of an aircraft, which is distinctive in that it has:

first means for determining values of the angle of attack and of the pitch rate of the aircraft, and also the angle of deflection of at least one elevator;

second means for determining current values of coefficients forming part of a reference model of a longitudinal movement of the aircraft;

third means for calculating a pitch moment $\Delta \hat{m}$, using the current values thus determined, preferably using the expression given above:

$$\Delta \hat{m} = \dot{q} - m\alpha^*(\alpha - \alpha eq) - mq^*q - m\delta q^*\delta q; \text{ and}$$

fourth means for transmitting to user means the pitch moment thus calculated, which represents an estimated unwanted pitch moment.

Furthermore, in a particular embodiment, said second means for determining the current coefficient values comprises:

means for determining current parameter values related to the aircraft's current flight point;

at least one storage means which comprises predetermined tables including the coefficient values as a function of current parameter values related to the flight point of the aircraft; and means for determining the current values of said coefficients using said tables and the current values of said parameters.

The present invention also relates to a system for controlling the pitch of an aircraft, of the type that comprises means for generating a command for controlled deflection of at least one elevator, in accordance with a manual actuation by a pilot taking into account a standard control law, and means for applying to the aircraft an actual angle of deflection dependent on said controlled deflection command. According to the invention, this system for controlling pitch comprises, in addition:

a device for estimating an unwanted pitch moment, like that mentioned above;

means for calculating a compensation command based on said unwanted pitch moment, estimated using said estimating device; and means for adding said compensation command to said controlled deflection command to form said actual deflection command that is applied to the aircraft.

This system for pitch control therefore produces, by virtue of the invention, an automatic and active (real time) compensation for any unwanted pitch moment.

The present invention further relates to an aircraft, in particular a transport aircraft, that is provided with such a device and/or such a system.

BRIEF DESCRIPTION OF THE DRAWINGS

The appended drawings will give a better understanding of how the invention can be embodied. In these drawings, identical references designate similar elements.

DETAILED DESCRIPTION OF THE PREFERRED EMBODIMENTS

Figure 1:
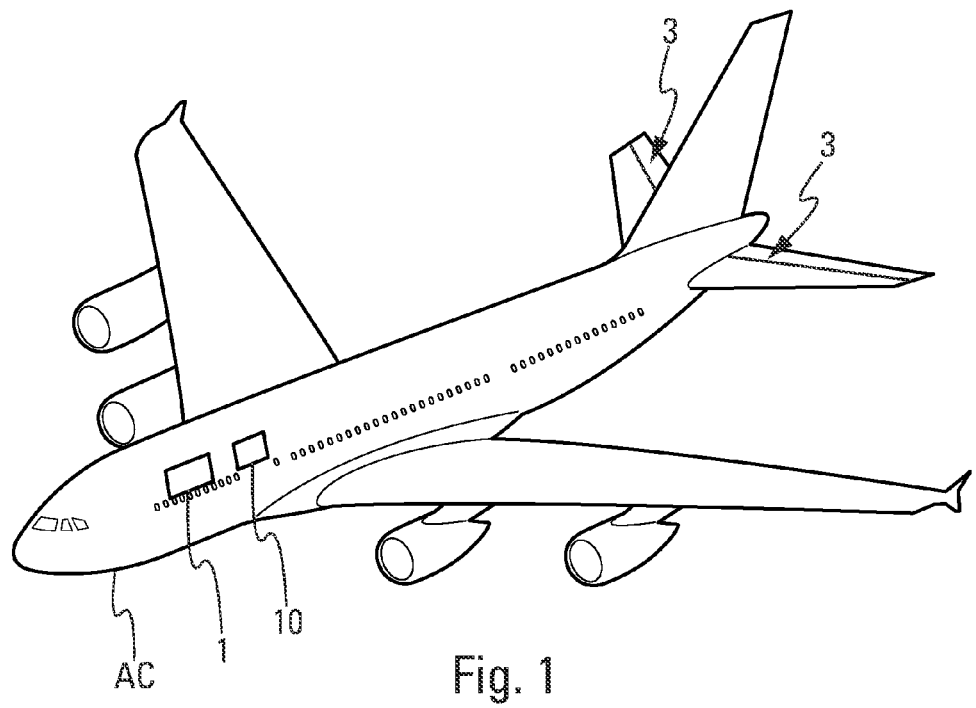
FIG. 1 shows an aircraft on which there is represented, very diagrammatically, a control system and an estimation device, illustrating the invention.

The system 1 according to the invention and shown very diagrammatically in FIG. 1 is intended to produce a pitch control of an aircraft AC, in particular of a transport aircraft.

Figure 2:
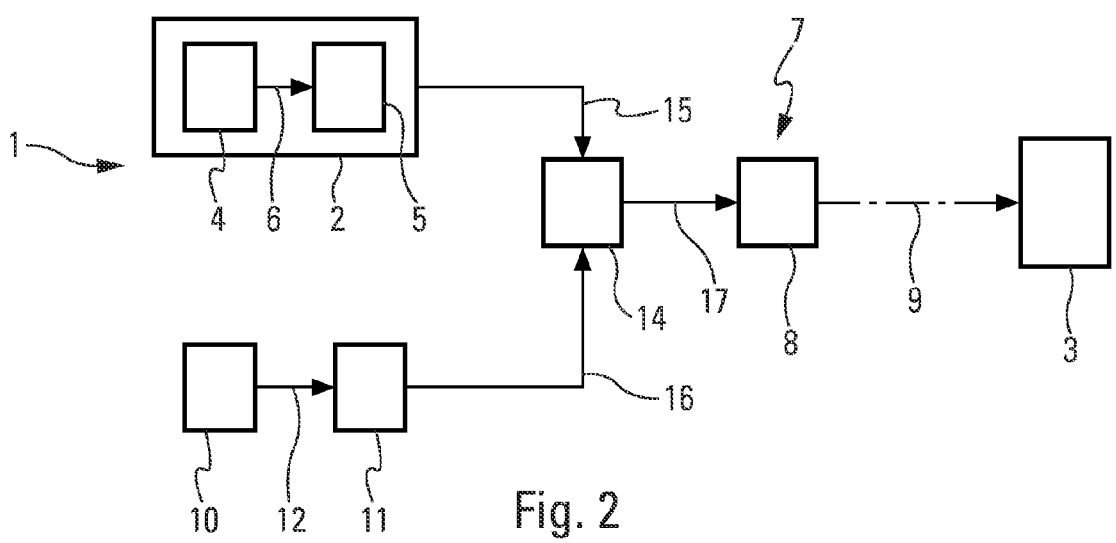
FIG. 2 is a block diagram of a pitch control system.

Usually, this system 1 which is on board the aircraft AC comprises, in particular, as shown in FIG. 2:

means 2 for generating a command for controlled deflection $\delta^*_{qc}{}^C$ of the elevators 3 of the aircraft AC, in accordance with a standard control law. This controlled deflection command $\delta^*_{qc}{}^C$ is representative of a manual actuation by a pilot, on a standard control stick (not shown); and means 7 for applying to the aircraft AC an actual angle of deflection $\delta^{eff}$ dependent on said controlled angle of deflection $\delta_{qc}{}^{C*}$.

In order to do this, said means 2 has, usually:

a set 4 of sources of information, which has means for determining (via measurements and/or calculations) the actual values of a plurality of parameters of the aircraft AC, and also the extent of the actuation by the pilot on a standard control stick able to act on the pitch of the aircraft AC; and means 5 for calculating, using the information received from the set 4 via a link 6, a deflection command $\delta_{qc}{}^{C*}$ known as a controlled deflection command which is representative of a manual actuation by a pilot.

To this end, said means 5 uses a standard mathematical law known as C*. This law C*, which is intended for the control of the flight of an aircraft on the pitch axis, is widely used in the field of aeronautics. In a general and known manner, it calculates a controlled deflection command $\delta_{qc}{}^{C*}$ to control the longitudinal load factor Nz of the aircraft, in accordance with a reference Nzc, being robust relative to external disturbances (using an integrator in the loop). It uses two measurements, namely the load factor Nz and the pitch rate q, as feedback.

Furthermore, said means 7 comprises, usually, means 8 for actuation of the elevators 3 of the aircraft AC. These usual actuating means 8 are formed so as to move said elevators 3, as shown via a link 9 indicated by a dot-and-dash line, into a particular position, representative of an angle of deflection known as actual received $\delta^{\text{eff}}$.

The present invention applies during a short-term command for a pitch movement (of the order of a few seconds, and generally less than ten seconds) issued by the pilot acting on the control stick, for which said pitch movement by the aircraft AC in flight can be disrupted by unwanted moments, and its object is to compensate for such moments.

In order to do this, said system 1 further comprises, according to the invention:

a device 10 for estimating an unwanted pitch moment, according to the invention and detailed below;

means 11 connected by a link 12 to said estimating device 10 and which are formed so as to calculate a compensation command $\delta_{qc}^{ANL}$ based on said unwanted pitch moment, estimated and sent by this estimating device 10. This compensation command $\delta_{qc}^{ANL}$, when applied to the elevators 3, compensates for the unwanted pitch moment estimated by the estimating device 10; and means 14, namely a summation component, connected via links 15 and 16 to said means 2 and 11 respectively and which is formed so as to add said compensation command $\delta_{qc}^{ANL}$ (received from the means 11) to said controlled deflection command $\delta_{qc}^{C^*}$ (calculated in the usual manner by the means 2). The sum thus calculated represents the actual deflection command $\delta^{\text{eff}}$ which is sent via a link 17 to the actuation means 8 that controls, in a corresponding manner, the deflection of the elevators 3 with the aim of controlling the pitch of the aircraft AC.

Said means 11 calculates the compensation command $\delta_{qc}^{ANL}$ using the following expression:

$$\delta_{qc}^{ANL} = -(\Delta\hat{m}/m\delta q)$$

where:

$\Delta\hat{m}$ is the unwanted pitch moment as estimated; and $m\delta q$ is a coefficient of a reference model, detailed below.

Consequently, the present invention proposes an additional flight control law for compensating for the unwanted pitch movement, which is defined by two functions.

More specifically:

a first function (implemented by the device 10) provides an estimate, in real time, of the unwanted pitch movement, on the basis of observations concerning the angle of attack, the pitch rate and the deflection of the elevator 3;

the second function (implemented by the device 11) uses this estimated movement to calculate an auxiliary deflection command (compensation command) for the elevators 3; and the sum of these two deflection commands is sent to the means 8 for actuating the elevators 3.

Thus, by virtue, in particular, of the means 10, 11 and 14, the pitch control system 1 produces a correction to the standard control command (in accordance with the C* law) in order to send an actual deflection command $\delta^{\text{eff}}$ which enables compensation to be made for an unwanted pitch moment.

Said system 1 thus compensates automatically and actively (acting on the elevators 3), in real time, for any unwanted moments that disrupt the pitch of the aircraft, so that said pitch remains unaffected by these moments for the pilot. This compensation, which uses the results from the device 10 for estimating an unwanted pitch moment, therefore does not require any knowledge of the different individual unwanted moments able to act on the aircraft AC, as detailed below.

Figure 3:
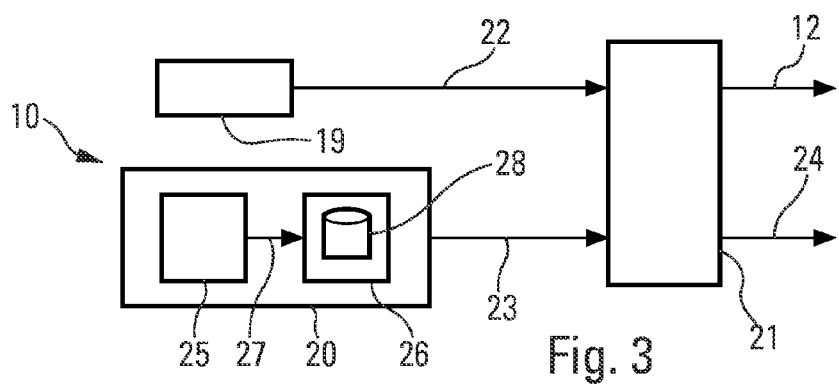
FIG. 3 is a block diagram of a device for estimating unwanted pitch moments.

Furthermore, said device 10 has, as shown in FIG. 3:

standard means 19, in particular the aircraft's measuring means, which can determine in real time the current values $\alpha$, q, $\delta q$, being the values of the angle of attack, pitch rate, and angle of deflection of the elevators 3 respectively;

means 20 for determining the current values $m\alpha$, $mq$, $m\delta q$ of coefficients (detailed below) forming part of a reference model of a longitudinal movement of the aircraft AC; and means 21 connected to said means 19 and 20 via links 22 and 23 respectively and which are formed so as to calculate a pitch moment $\Delta\hat{m}$, using the current values thus determined, and using the following expression:

$$\Delta\hat{m} = \dot{q} - m\alpha^*(\alpha - \alpha eq) - mq^*q - m\delta q^*\delta q$$

where, in addition:

$\dot{q}$ is the derivative of the pitch rate (in deg/$s^2$); and $\alpha eq$ is an equilibrium value of the angle of attack of the aircraft AC, detailed below.

The device 1 also comprises links 12 and 24 to send to the user means the pitch moment thus calculated, which represents an estimated unwanted pitch moment.

In a particular embodiment, said means 20 comprises:

means 25 for determining, in a usual manner, the current values of parameters related to the current flight point of the aircraft AC, namely the current values for the speed, Mach number, mass, aerodynamic configuration (slats and flaps) and balance condition of the aircraft AC; and means 26 which are connected to said means 25 via a link 27 and which are formed in such a way as to determine the current values $m\alpha$, $mq$, $m\delta q$ of said coefficients using the current values of said parameters received from the means 25 and predetermined tables.

These predetermined tables, which comprise the values of said coefficients, as a function of values of parameters related to the flight point of the aircraft, have been formed in advance using calculations and tests, and are recorded in a storage means 28. This storage means 28 can be incorporated into specific means of the device 10 and in particular into the means 26.

Thus, the device 10 according to the invention makes it possible to estimate automatically, precisely and in real time any unwanted pitch moment $\Delta\hat{m}$ that is produced on the aircraft AC. This unwanted pitch moment $\Delta\hat{m}$ is an overall moment that illustrates the difference between the actual longitudinal movement, observed on the aircraft, and the longitudinal movement as it ought to be according to the current situation taking into account a reference model, as detailed below.

Determining this overall unwanted pitch moment does not require any knowledge of the change, over time, in the different individual unwanted moments capable of acting on the aircraft AC, such changes over time being difficult to evaluate.

The mathematical formula used to calculate the unwanted pitch moment $\Delta\hat{m}$ will now be detailed.

It is known that the longitudinal movement of the aircraft AC can be described by its equation of pitch motion, around an equilibrium characterised by an equilibrium angle of attack $\alpha eq$ (which is obtained in the standard manner):

$$\dot{q} m\alpha^*(\alpha - \alpha eq) + mq^*q + m\delta q^*\delta q + \Delta(x)$$

In this equation $\Delta m$ represents all the unwanted pitch movements, is expressed in deg/$s^2$ and can be dependent on several parameters x such as the angle of attack, the Mach number, etc.

$\Delta m$ is unknown, whereas $m\alpha$, $mq$, $m\delta q$, are known (they can be determined) and are available in real time in the flight control computers.

The desired longitudinal movement of the aircraft is defined by the following reference model:

$$\dot{q}=m\alpha*(\alpha-\alpha eq)+mq*q+m\delta q*\delta q$$

An estimated $\Delta \hat{m}$ of the unwanted pitch moment can be defined, in theory, by the equation given above:

$$\Delta \hat{m}=\dot{q}-m\alpha*(\alpha-\alpha eq)-mq*q-m\delta q*\delta q$$

In practice, the equation $\Delta \hat{m}=\dot{q}-m\alpha*(\alpha-\alpha eq)-mq*q-m\delta q*\delta q$ is calculated by the means 21 using filters which, in the Laplace transform (of variable s), are defined as:

$$A^F1(s)=(\tau 1s/(1+\tau 1s))$$

$$B^F21(s)=(s/(1+\tau 2s))$$

$$C^F22(s)=(1/(1+\tau 2s))$$

$\tau i$ is a time constant (for i=1, 2, ... ).

The estimated $\Delta \hat{m}$ is therefore calculated by the means 21 using the values $\alpha$, q, $\delta q$ and the following expression:

$$\Delta \hat{m}(s)=F21(s)*F1(s)* \quad q-F22(s)*F1(s)*(m\alpha*\alpha-mq*q-m\delta q*\delta q)$$

Consequently, if the accuracy of the estimated $\Delta \hat{m}$ is sufficient, in other words, if $\Delta \hat{m} \approx \Delta m$, the equation of longitudinal motion of the aircraft AC, namely $\dot{q}=m\alpha*(\alpha-\alpha eq)-mq*q-m\delta q*\delta q+\Delta m(x)$, is not affected by any unwanted pitch moment (when $\delta q=\delta qeff$, which is obtained by the internal dynamics of the elevators 3) and the dynamics of the aircraft AC exactly follow the behavior of the reference model $\dot{q}=m\alpha*(\alpha-\alpha eq)-mq*q+m\delta q*\delta q$.

The unwanted pitch moment, determined by the device 10 according to the invention in the manner described above, can be sent by the link 12 to said means 11 of the pitch control system 1, as indicated with reference to FIG. 2.

This unwanted pitch moment can also be sent by a link 24 to other means or systems (not shown) of the aircraft AC, which might need such information.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for controlling the pitch of an aircraft, comprising the steps:
   producing a command for controlled deflection of at least one elevator, in accordance with a standard control law, said controlled deflection command being representative of a manual actuation by a pilot, and
   applying to the aircraft an actual deflection command depending on said controlled deflection command, comprising the steps of:
   estimating an unwanted pitch moment by:
   determining current values of an angle of attack and of a pitch rate of the aircraft, and also an angle of deflection of at least one elevator of the aircraft;
   determining current values of coefficients forming part of a reference model of a longitudinal movement of the aircraft;
   calculating a pitch moment $\Delta \hat{m}$ using the current values thus determined, using the following expression:

$$\Delta \hat{m}=\dot{q}-m\alpha*(\alpha-\alpha eq)-mq*q-m\delta q*\delta q$$

where:
q is the current value of the pitch rate of the aircraft;
$\dot{q}$ is the pitch rate derivative;
$\alpha$ is the current value of the angle of attack of the aircraft;
$\alpha eq$ is an equilibrium value of the angle of attack of the aircraft;
$\delta q$ is the current value of the angle of deflection of the elevator; and
$m\alpha$, $mq$, $m\delta q$ are said current coefficient values; and
sending to user means the pitch moment thus calculated, which represents an estimated unwanted pitch moment;
calculating a compensation command, from the unwanted pitch moment thus estimated; and
summing said compensation command and said controlled deflection command to form said actual deflection command which is applied to the aircraft.

2. The method according to claim 1, wherein the compensation command $\delta_{qc}^{ANL}$ is calculated using the following expression:

$$\delta_{qc}^{ANL}=-(\Delta \hat{m}/m\delta q)$$

where:
$\Delta \hat{m}$ is the unwanted pitch moment as estimated; and
$m\delta q$ is a coefficient of a reference model.

3. A device for automatic estimation of an unwanted pitch moment of an aircraft, that is, a pitch moment which is not produced by an action by a pilot on a control stick, which has a disruptive effect and which is not wanted, said device comprising a processor configured for:
   producing a command for controlled deflection of at least one elevator, in accordance with a standard control law, said controlled deflection command being representative of a manual actuation by a pilot, and
   applying to the aircraft an actual deflection command depending on said controlled deflection command, comprising the steps of:
   estimating an unwanted pitch moment by:
   determining values of the angle of attack and of the pitch rate of the aircraft, and also the angle of deflection of at least one elevator;
   determining current values of coefficients forming part of a reference model of a longitudinal movement of the aircraft;
   calculating a pitch moment using the current values thus determined, said third means being formed to calculate the pitch moment $\Delta \hat{m}$ using the following expression:

$$\Delta \hat{m}=\dot{q}-m\alpha*(\alpha-\alpha eq)-mq*q-m\delta q*\delta q$$

where:
q is the current value of the pitch rate of the aircraft (AC);
$\dot{q}$ is the pitch rate derivative;
$\alpha$ is the current value of the angle of attack of the aircraft (AC);
$\alpha eq$ is an equilibrium value of the angle of attack of the aircraft (AC);
$\delta q$ is the current value of the angle of deflection of the elevator (3); and
$m\alpha$, $mq$, $m\delta q$ are said current coefficient values; and
calculating a compensation command, from the unwanted pitch moment thus estimated; and summing said compensation command and said controlled deflection command to form said actual deflection command which is applied to the aircraft.

4. The device according to claim 3, wherein determining the current coefficient values comprises:
   determining current values of parameters related to a current flight point of the aircraft;
   determining said coefficients, using said current parameter values and predetermined tables.

5. A system for controlling the pitch of an aircraft including a device for estimating an unwanted pitch moment, according to claim 3, said system configured for:
   generating a command for controlled deflection of at least one elevator, in accordance with a standard control law, said controlled deflection command being representative of a manual actuation by a pilot, and means for applying to the aircraft an actual angle of deflection dependent on said controlled deflection command,
   calculating a compensation command based on said unwanted pitch moment, estimated using said estimating device; and
   adding said compensation command to said controlled deflection command to form said actual deflection command that is applied to the aircraft.

6. An aircraft comprising a device according to claim 3.

7. An aircraft comprising a system according to claim 5.

8. The method according to claim 1, wherein said current values of the angle of attack, pitch rate and angle of deflection of the elevator are measured.

9. The method according to claim 1, wherein said step of determining the current coefficient values comprises:
   a sub-step of determining current values of parameters related to a current flight point of the aircraft (AC); and
   a sub-step of determining said coefficients, using said current parameter values and predetermined tables.

* * * * *